(12) United States Patent
Crampon et al.

(10) Patent No.: US 10,981,820 B2
(45) Date of Patent: Apr. 20, 2021

(54) SLUDGE DEWATERING PROCESS ASSISTED BY FLOCCULATING REACTANT AND PLANT FOR THE IMPLEMENTATION OF SUCH A PROCESS

(71) Applicant: Veolia Water Solutions & Technologies Support, Saint-Maurice (FR)

(72) Inventors: Cédric Crampon, Champigney-sur-Marne (FR); Malik Djafer, Boulogne-Billancourt (FR); Éric Guibelin, Saponay (FR)

(73) Assignee: Veolia Water Solutions & Technologies Support, Saint Maurice (FR)

( * ) Notice: Subject to any disclaimer, the term of this patent is extended or adjusted under 35 U.S.C. 154(b) by 334 days.

(21) Appl. No.: 16/307,288

(22) PCT Filed: May 15, 2017

(86) PCT No.: PCT/EP2017/061634
§ 371 (c)(1),
(2) Date: Feb. 4, 2019

(87) PCT Pub. No.: WO2017/211542
PCT Pub. Date: Dec. 14, 2017

(65) Prior Publication Data
US 2020/0290911 A1 Sep. 17, 2020

(30) Foreign Application Priority Data
Jun. 8, 2016 (FR) ...................................... 1655229

(51) Int. Cl.
*C02F 9/00* (2006.01)
*C02F 1/52* (2006.01)
(Continued)

(52) U.S. Cl.
CPC .............. *C02F 9/00* (2013.01); *C02F 1/5245* (2013.01); *C02F 1/34* (2013.01); *C02F 11/121* (2013.01);
(Continued)

(58) Field of Classification Search
CPC ........ C02F 9/00; C02F 1/5245; C02F 11/121; C02F 11/13; C02F 1/34; C02F 11/127;
(Continued)

(56) References Cited

U.S. PATENT DOCUMENTS 6,808,636 B2 * 10/2004 Ward ...................... C02F 11/18
  210/710
2008/0047903 A1 2/2008 Morse

FOREIGN PATENT DOCUMENTS

JP 2015000380 A 1/2015
WO 2009065509 A1 5/2009
(Continued)

OTHER PUBLICATIONS

Machine-generated English Translation of WO 2009/065509 A1, dated Dec. 16, 2020.*
(Continued)

*Primary Examiner* — Fred Prince
(74) *Attorney, Agent, or Firm* — Coats & Bennett PLLC

(57) ABSTRACT

Sludge dewatering process assisted by flocculating reactant, said process comprising an injection of flocculating reactant into the sludge and a step of dewatering said sludge, characterized in that it comprises a preliminary step that consists in mixing said sludge in a mixer (4) comprising a cylindrical chamber (4a) equipped with blades (4c) rotatably mounted on a shaft (4b) rotating at a speed of rotation of between 500 rpm and 4000 rpm, so as to destructure the sludge and reduce the viscosity thereof, and in discharging the sludge from said mixer (4) via a network (11) to said (Continued)

dewatering step, and in that it comprises a step of depressurizing said mixer (4) and said network giving rise to the lysis, by cavitation, of said sludge, said depressurizing step being carried out over a period of at least 0.1 second. Corresponding plant.

21 Claims, 2 Drawing Sheets

(51) Int. Cl.
*C02F 11/13* (2019.01)
*C02F 1/34* (2006.01)
*C02F 11/12* (2019.01)
*C02F 11/14* (2019.01)
*C02F 11/127* (2019.01)
*C02F 11/121* (2019.01)

(52) U.S. Cl.
CPC ............. *C02F 11/127* (2013.01); *C02F 11/13* (2019.01); *C02F 11/14* (2013.01); *C02F 2201/005* (2013.01); *C02F 2301/063* (2013.01); *C02F 2303/06* (2013.01); *C02F 2303/26* (2013.01)

(58) Field of Classification Search
CPC ................ C02F 11/14; C02F 2201/005; C02F 2301/063; C02F 2303/06; C02F 2303/26
USPC ....... 210/721, 608, 631, 173, 175, 179, 723, 210/732
See application file for complete search history.

(56) References Cited

FOREIGN PATENT DOCUMENTS

| WO | 2012108312 A1 | 2/2012 |
| WO | 2015079175 A1 | 6/2015 |
| WO | 2015079177 A1 | 6/2015 |

OTHER PUBLICATIONS

Machine-generated English Translation of WO 2015/079175 A1, dated Dec. 16, 2020.*
Machine-generated English Translation of WO 2015/079177 A1, dated Dec. 26, 2020.*
Gogate, P.R., et al., "A review of applications of cavitation in biochemical engineering/biotechnology", Biochemical Engineering Journal, Elsevier, Amsterdam, NL, vol. 44, No. 1, Apr. 15, 2009, pp. 60-72, XP025989157.

* cited by examiner

SLUDGE DEWATERING PROCESS ASSISTED BY FLOCCULATING REACTANT AND PLANT FOR THE IMPLEMENTATION OF SUCH A PROCESS

This application is a U.S. National Stage Application of PCT Application No. PCT/EP2017/061634, with an international filing date of 15 May 2017. Applicant claims priority based on French Patent No. 1655229 filed 8 Jun. 2016. The subject matter of these applications is incorporated herein.

FIELD OF THE INVENTION

The field of the invention is that of sludge treatment with or without organic matter content. The invention in particular relates to the treatment, of sludge produced by wastewater treatment plants, that may or may not be mixed with other waste, in addition to that of sludge originating from drinking water production methods or sludge derived from other industrial processes.

More specifically, the invention relates to a method for dewatering sludge, regardless of the origin thereof, implementing an injection of a flocculating reagent, such as a polymer, therein. Such methods are referred to herein as "flocculating reagent-assisted dewatering" methods.

Such a method is in particular applicable to the dewatering of sludge, where relevant to sludge that has already been thickened, having a low dryness, in practice of less than 15 wt. % (preferably from 2 wt. % to 7 wt. %). The term "sludge dryness" is understood herein as the weight percentage of dry matter contained therein. More specifically, sludge is a fluid composed of a mixture of mineral matter and water, and contains chemical residues when derived from industrial processes, and where relevant organic matter. Sludge dryness is calculated by drawing up the weight ratio between the weight of the dry matter and the total weight of the sludge.

Said sludge can in particular be derived from drinking water purification processes or from domestic or industrial effluent treatment processes.

PRIOR ART

Water treatment processes generate large volumes of sludge and increasingly so with industrial and urban development.

Methods have been developed in recent decades to reduce the volume of said sludge, and in particular dewatering methods.

Said dewatering methods can be implemented using various types of equipment (centrifuges, drums, tables, tray filters, belt filters, etc.) and use suitable flocculating reagents and/or coagulating reagents that encourage the separation of water from the rest of the sludge within the equipment in question.

The costs of implementing said flocculating reagent-assisted dewatering methods are impacted in a non-negligible manner by the cost of said flocculating reagent. In particular, certain types of sludge that are particularly difficult to dewater require heavy doses of flocculating reagent, which increases the operating costs of the facilities implementing such methods.

Different methods have thus been proposed in the prior art to optimise the consumption of said flocculating reagents or to avoid the use thereof.

The Déhydris Lime® method by SUEZ Environnement is thus known, consisting of mixing lime with the sludge to be dewatered in a mixer, then of conveying same to a centrifuge, at the spout of which the polymer is injected.

Such a technique has the drawback of requiring the provision of another additive in addition to the flocculating reagent, namely lime, and thus of increasing the weight of the sludge. Any savings made on the quantities of polymers distributed are at least partially compensated for by the expenses inherent to the provision of lime and the discharging of the additional volume of sludge.

The Déhydris Osmo® method by SUEZ Environnement is also known, aiming at subjecting the sludge to a magnetic field in order to modify the zeta potential thereof.

Such a method has the drawback of involving the implementation of a magnetic field, which is a complex technique to implement.

The FlocFormer® method by Aquen is also known, and implements two main steps. The first step consists of injecting a polymer into a stirring chamber receiving the sludge. The second step consists of flocculating the mixture of sludge and polymer in a second, larger chamber with light stirring to form the floes.

This technique has the drawback of generating high energy consumption levels related to the potentially very large volume of the flocculation chamber. Moreover, the device implementing such a method is independent of the dewatering facility, upstream of which it is provided, and must therefore be managed independently therefrom.

The SLG® method by Orege is also known, and proposes subjecting the sludge to a light flow of compressed air, at about 1 to 2 bar, before expanding and degassing the mixture of sludge and compressed air in order to facilitate subsequent dewatering. The polymer is injected into the spout of the centrifuge, or more or less upstream of the centrifuge, in the sludge supply pipe, as may be recommended by the prior art in certain situations.

Such a method has the drawback of being implemented in bulky facilities and involves a group of expensive elements that require maintenance such as, for example, a compressor, a reactor or another separator.

The IHM® ("in-line hydrodynamic mixer") method by EMO consists of injecting the polymer upstream of the centrifuge, then of creating turbulence by means of a valve in order to improve the sludge/polymer mixture, whereby the energy needed to create the turbulence comes from the fluid itself and therefore from the supply pump of the centrifuge.

Finally, the Crown® method by Siemens can also be cited, which consists, upstream of a digester, of pressurising the sludge to 20 bar through a venturi tube for the very fast de-structuring thereof at the nozzle.

All of said methods of the prior art share the drawback of having to be implemented in bulky facilities. Moreover, none of said methods have proven the generation of real savings in polymer consumption, except when adding lime, nor have they shown any significant gain in dryness, i.e. a gain of more than 1.5% dryness.

PURPOSES OF THE INVENTION

The purposes of the invention are to propose a method for improving the dryness of sludge at the output of any dewatering method, and more particularly at the output of a centrifuge, at equal levels of flocculating reagent consumption and at an equal quality of supernatants, and/or for optimising the consumption of flocculating reagent at an equal quality of supernatants, and/or for optimising the load of the dewatering equipment such as the existing centrifuges, and/or for increasing the rate of capture of the solid phase by the flocculating reagent.

Another purpose of this invention is to describe such a method that can be easily integrated into an existing dewatering process without interfering therewith.

Another purpose of this invention is to propose a facility for implementing such a method.

One purpose of this invention is to disclose such a facility which, in at least some embodiments, can integrate existing dewatering equipment in order to optimise the operation thereof.

In particular, one purpose of this invention is to disclose such a facility that optimises the operation of sludge dewatering devices, mainly including centrifuges, but also filter presses and belt filters, etc.

One purpose of this invention is also to describe such a facility, the set-up whereof can take place very easily without any need to dismantle, move or replace the dewatering equipment, such as the centrifuge already in place.

DESCRIPTION OF THE INVENTION

These purposes, in addition to others that shall appear hereafter, are achieved by the invention, which relates to a method for dewatering sludge assisted by a flocculating reagent, said method comprising an injection of a flocculating reagent, such as a polymer, into sludge and a step of dewatering said sludge, characterised in that it comprises a preliminary step consisting of mixing said sludge in a mixer comprising a cylindrical chamber provided with blades mounted such that they rotate about a shaft revolving at a rotational speed of between 500 revolutions per minute and 4,000 revolutions per minute, in such a way as to de-structure same and reduce the viscosity of same, and to discharge the sludge originating from said mixer via a network to said dewatering step, and in that it comprises a step of depressurising said mixer and said network resulting in the lysis of said sludge by cavitation, said depressurisation step being performed for a duration of at least 0.1 seconds.

The invention therefore proposes a method that is simple to implement, aimed at subjecting the sludge to be dewatered to mixing in order to de-structure same and lower the viscosity of same, whereby the depressurisation of the mixer encourages the de-structuring thereof by improving heat transfer. The depressurisation of the network allows, for the mechanical lysis of the sludge by cavitation.

Said method is used to increase the affinity of the sludge for the flocculating reagent and, as a corollary, to increase the efficiency thereof within the dewatering equipment. The method also makes it possible to refine the biggest and/or heaviest particles present in the sludge and potentially release more water bound thereto. During the mechanical lysis, said method also releases more bound water and further reduces the size of the particles. Such an increase in efficiency results in dryness points gained at the output of the dewatering equipment for an equal level of flocculating reagent consumption, or in substantially reducing the doses of flocculating reagent that must be used to obtain a given sludge dryness, or in increasing the efficiency of capture of the organic matter by the flocculating reagent, or even in increasing the load of the dewatering equipment. In any case, the invention provides major savings in the operating costs of such equipment and in the costs of discharging sludge.

Preferably, said depressurisation step consists of applying to said mixer and to the network is performed a pressure of less than 0.001 bar to 1 bar at atmospheric pressure for a duration of between 0.1 seconds and 30 seconds, preferably between 1 second and 10 seconds.

Advantageously, said preliminary step consisting of mixing said sludge comprises the introduction thereof into a mixer comprising a cylindrical chamber equipped with blades mounted such that they rotate about a shaft revolving at a rotational speed that preferably lies in the range 1,000 revolutions per minute to 2,000 revolutions per minute. Such mixing speeds further optimise the purpose sought, namely increasing the efficiency of the flocculating reagent.

The method according to the invention can be implemented with any dewatering method. Therefore, advantageously, said dewatering step is a centrifugation step implemented using at least one centrifuge. Centrifuges are commonly used to dewater sludge. A centrifuge is an expensive piece of equipment the price of which varies greatly according to size and performance. The method according to the invention therefore offers an economically advantageous alternative to replacing equipment with lower performance levels (older equipment) by equipment with higher performance levels (more modern equipment).

According to one alternative embodiment of the invention, said polymer injection takes place into the spout of said centrifuge "spout" of the centrifuge is understood herein as being the input point thereof at which the material to be centrifuged enters).

However, according to one particularly advantageous alternative embodiment, said step of injecting a flocculating reagent is performed by injecting said polymer during or upstream of said preliminary step. Such an alternative embodiment makes it possible to optimise the efficiency of the flocculating reagent and therefore the performance levels of the dewatering equipment. According to such an alternative embodiment, the flocculating reagent is mixed with the sludge that has been de-structured and mechanically lysed by cavitation in order to give an intimate blend in which the function of the flocculating reagent is optimised.

According to an alternative embodiment of the invention, the method further comprises an injection of an additive, in particular a coagulant such as ferric chloride, or a pH corrector such as $CO_2$, into said sludge during or upstream of said preliminary step. Such a step further optimises the action of the flocculating reagent on the sludge.

According to an alternative embodiment of the invention, the method comprises the injection of hot water and/or of live steam or flash steam and/or of condensates (such condensates can be derived from other processes and available on the site), during or upstream of said preliminary step to preheat said sludge. Such a pre-heating step further reduces the viscosity of the sludge and further optimises the dewatering thereof, while at the same time optimising the level of flocculating reagent consumption.

According to an alternative embodiment of the invention, the method further comprises an injection of dilution water into said sludge during or upstream of said preliminary step. Such a step dilutes the sludge so as to further optimise the contact between the flocculating reagent and the sludge.

Also according to an alternative embodiment of the invention, the method comprises an oxygenation of said sludge during or upstream of said preliminary step. This step, also enables the flocculating reagent to interact better with the sludge by forming a sludge/polymer/air emulsion in the chamber of the mixer.

All of said fluids are mixed at very high speed in the chamber of the mixer, the dimensions of which are calculated accordingly.

The invention further relates to a facility for implementing the method according to the invention, comprising a sludge dewatering equipment item and means for injecting a flocculating reagent, characterised in that it includes a mixer comprising a cylindrical chamber provided with blades mounted such that they rotate and positioned upstream of said dewatering equipment, and a transportation network for transporting said sludge from said mixer to said dewatering equipment and in that it comprises means for depressurising said chamber of said mixer and of said network.

Such mixers are commercially available. The sole purpose of the blades is to mix the sludge. They play no part in making the sludge move forward in the chamber. The cylindrical chamber has a small volume and the residence time therein is very short, equal to about several seconds.

Preferably, said depressurisation means include a valve provided upstream of said mixer and a pump provided downstream of said mixer, which can be actuated so as to allow the cavitation of the sludge travelling through the network.

Such a mixer and such depressurisation means can easily be integrated into a pre-existing facility including said dewatering equipment in order to enhance the performance levels thereof.

More advantageously, said dewatering equipment is a centrifuge.

Preferably, said mixer is connected to means for injecting a flocculating reagent such as a polymer.

According to an alternative embodiment, said mixer is connected to means for injecting an organic or inorganic coagulant such as ferric chloride.

According to an alternative embodiment, said mixer is connected to means for injecting dilution water.

Also according to an alternative embodiment, said mixer is connected to means for injecting hot water and/or live or flash steam and/or condensates to preheat the sludge.

Also according to an alternative embodiment, said mixer is connected to means for injecting compressed air.

BRIEF DESCRIPTION OF THE DRAWINGS

The invention, in addition to the different advantages thereof, will be more easily understood after reading the following description of an embodiment of the invention, given for illustrative purposes and in no way limiting the scope of the invention, with reference to the figures, in which.

DESCRIPTION OF THE EMBODIMENTS OF THE INVENTION FACILITY

Figure 1:
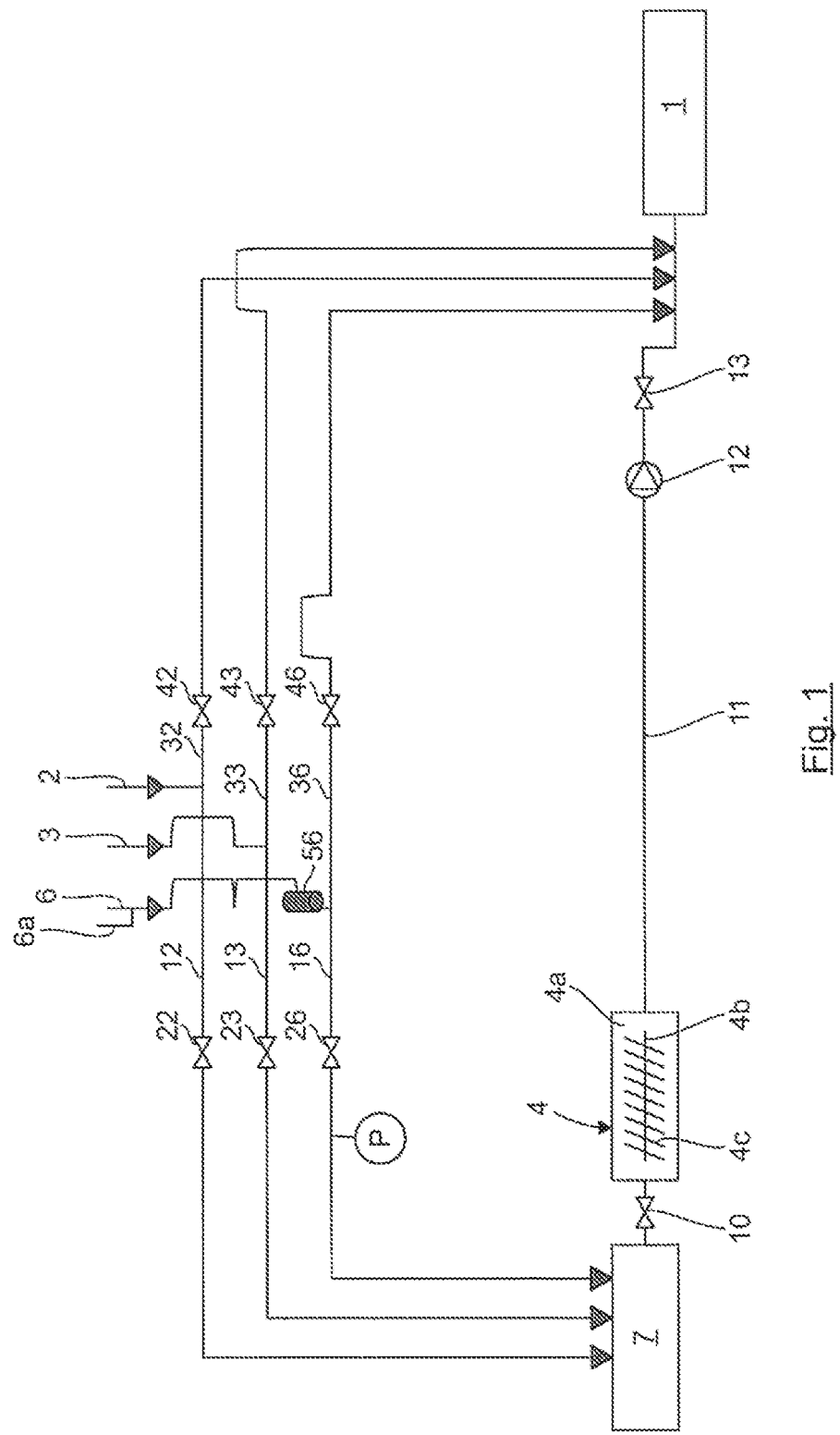
FIG. 1 is a diagrammatic representation of a facility according to this invention.

With reference to FIG. 1, the facility comprises a sludge dewatering equipment item 1 constituted by a centrifuge. Said centrifuge is connected to sludge supply means 2 and to polymer injection means 3.

In accordance with this invention, the facility further comprises a mixer 4 provided upstream of said dewatering equipment, provided with water supply means 6 and, where necessary, means for injecting ferric chloride 6a in the event of chemical conditioning of the sludge. The optional addition of ferric chloride is used to reduce the colloidal stability of the sludge.

The sludge supply means 2, the polymer injection means 3, the water supply means 6 and the optional ferric chloride injection means 6a are connected by pipes, respectively 12, 13, 16 to a collector 7. Valves 22, 23, 26 enable the distribution therein of the sludge, polymer, and water respectively, potentially mixed with ferric chloride.

The sludge supply means 2, the polymer injection means 3 and the water supply means 6 are connected by pipes, respectively 32, 33, 36 to the centrifuge 1. Valves 42, 43, 46 enable the distribution of the sludge, polymer and water respectively, directly to the spout thereof.

The pipes 16 and 36 for conveying water respectively to a mixing tank 7 and to the centrifuge are each equipped with a common flow meter 56.

In accordance with this invention, the mixer 4 comprises a cylindrical chamber 4a equipped with a rotating shaft 4b on which blades 4c are mounted. The rotating shaft is moved by a motor (not shown in FIG. 1) which enables the blades to be driven at a high rotational speed in the range 500 revolutions per minute to 4000 revolutions per minute.

The mixer 4 receives the sludge mixed with polymer, and where relevant with ferric chloride, and where relevant with water originating from the mixing tank 7, via a common pipe equipped with a valve 10. The mixed, lysed sludge is conveyed towards the centrifuge by a pipe 11 equipped with a pump 12 and a valve 13.

The facility described herein enables the sludge, water and polymer to be conveyed to the collector 7 and/or directly to the centrifuge 1.

METHOD

The facility shown in FIG. 1 was implemented to dewater mixed sludge, digested according to the prior art on the one hand and according to the invention on the other hand. Said sludge had an initial dryness of 28%.

Within the scope of these experiments, the centrifuge was always used at maximum capacity (2000 G).

In a first experimental phase, the valves 22, 23, 26, 46 were closed and only the valves 42 and 43 were open so as to direct the sludge and the polymer originating from the supply means 2 and 3 of said components directly to the spout of the centrifuge 1, without travelling through the mixer, according to the prior art.

In a second experimental phase, according to the invention, the valves 23, 26, 46 were kept closed. The valve 22 was opened to allow the distribution of the sludge in the mixer 4 via the tank 7 and the valve 42 was closed. The valve 43 was kept open to continue to convey the polymer to the spout of the centrifuge 1.

In a third experimental phase, the valves 26 and 46 were kept closed. The valve 22 was kept open, the valve 43 was closed and the valve 23 was opened to allow, according to the invention, the conveyance of the sludge and polymer to the mixer 4.

During said third experimental phase, the mixture originating from the collector 7 was pumped using the pump 12 in the mixer 4 and the valve 10 was partially closed, so as to cause a cavitation of said mixture by the depressurisation of the chamber of the mixer 4 in addition to the network between the valve 10 and the pump 12 for 1 to 5 seconds. In practice, the pressure in said chamber and in the network is lowered to 0.1 to 0.3 bar below atmospheric pressure.

The depressurisation of the network between the closed valve 10 and the pump 12 causes the cavitation of the pump 12 resulting in the operation thereof outside of the pump performance curve thereof. The valve 13 creates a loss of load downstream of the pump 12 so as to return the pump 12 to a pump performance curve (the TDH of the pump is corrected) and such that the latter is always under load and does not become bound.

During each of said three experimental phases, the polymer was used at three different doses, namely 5 kg/TDM (tonnes of dry matter), 7.5 kg/TDM and 11 kg/TDM.

The mixer was used for the second and third experimental phases with a blade speed of 2000 revolutions per minute, enabling the sludge to be de-structured before being conveyed to the centrifuge 1.

Since the sludge did not need it, no ferric chloride was added.

Figure 2:
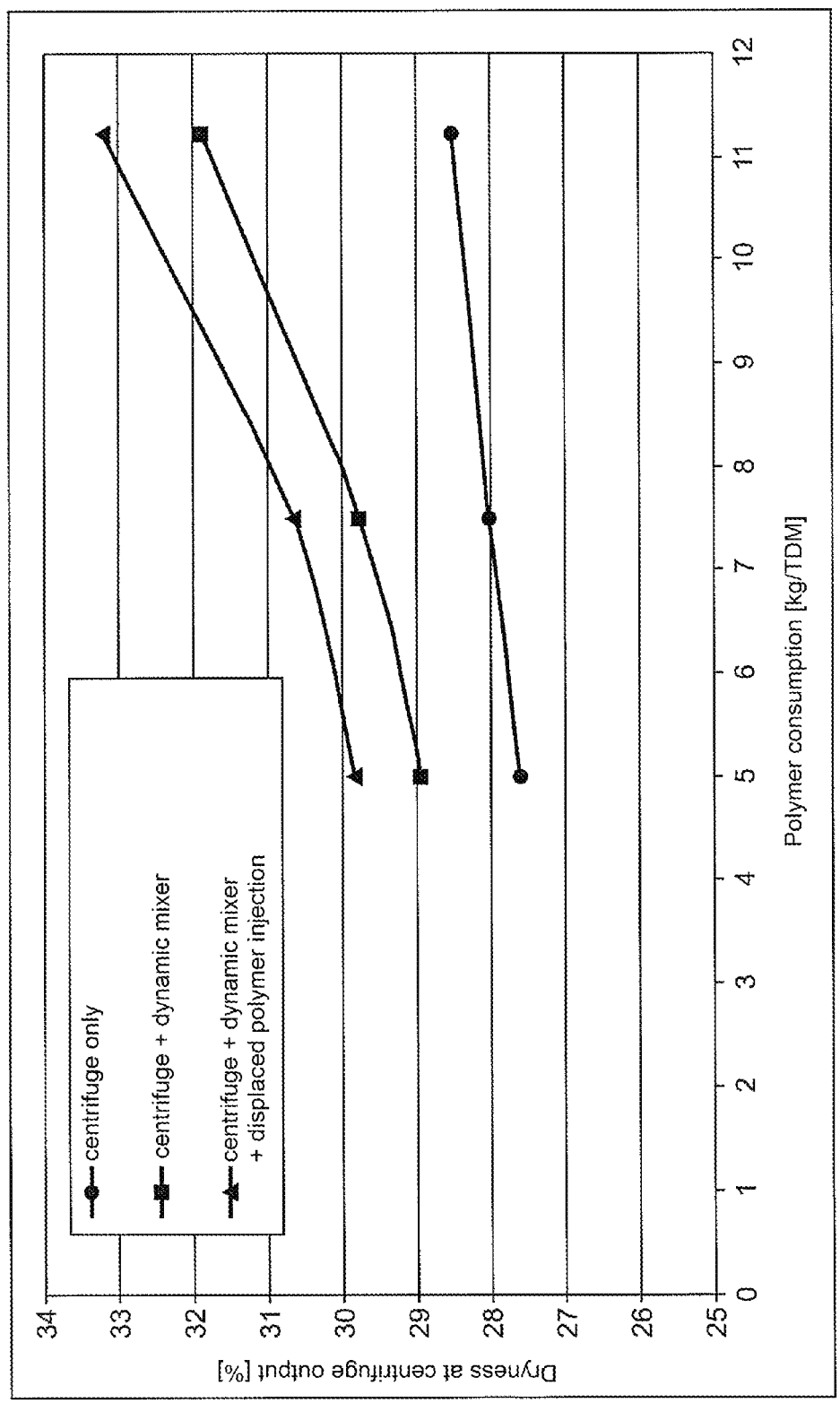
FIG. 2 is a graph showing the levels of flocculating reagent (polymer) consumption during the implementation of the facility according to FIG. 1 using the method according to the invention on the one hand, and a conventional method of the prior art on the other hand.

The dryness results for the sludge at the output of the centrifuge 1 are summarised in the graph shown in FIG. 2.

Said results show that, with the same polymer dose, it is possible, by means of the invention, to obtain a sludge dryness that is far better with the invention, in particular when the polymer is injected into the collector provided upstream of the dynamic mixer.

Thus, for a polymer dose of 11.3 kilograms per tonne of dry matter (TDM), by means of the invention, a sludge dryness of 32% was obtained, and a sludge dryness exceeding 33% was obtained by injecting the polymer upstream of the dynamic mixer, whereas the dryness obtained according to the prior art was only 28.5%. These results were produced without the addition of ferric chloride and compressed air, because this was not needed by the sludge. A comparable dryness of 29% was obtained by implementing the polymer at a rate of only 5 kg/TDM, resulting in savings of nearly 50% in the quantity of polymer.

The invention claimed is:

1. A method of dewatering sludge with assistance of a flocculating reagent and increasing efficiency of the flocculating reagent, the method comprising:
   injecting the flocculating reagent into the sludge;
   directing the sludge into a mixer having a cylindrical chamber provided with rotating blades;
   destructuring the sludge and reducing the viscosity of sludge in the mixer by rotating the blades at a speed of 500-4,000 revolutions per minute;
   discharging the destructured sludge from the mixer into a sludge transportation network that directs the sludge from the mixer;
   lysising the sludge in the mixer and in the network by depressurising said mixer and network for at least 0.1 seconds which results in the lysising of the sludge in the mixer and the network by cavitation;
   after lysising the sludge, directing the sludge to a dewatering unit and dewatering the sludge; and
   wherein the flocculating reagent is mixed with the sludge in the mixer or at a point downstream of the mixer.

2. The method of claim 1 wherein there is a valve disposed upstream of the mixer and a pump disposed downstream of the mixer, and wherein the method includes causing cavitation of the sludge in the mixer and in the network by partially closing the valve disposed upstream of the mixer and operating the pump.

3. The method of claim 2 wherein a second valve is disposed downstream of the pump, and wherein, after a cavitation of the pump, the second valve returns the pump to a pump performance curve.

4. The method of claim 1 wherein the dewatering unit includes a centrifuge including a spout; and wherein the method includes injecting the flocculating reagent into the spout of the centrifuge where the flocculation reagent is mixed with the sludge.

5. The method of claim 1 wherein depressurising the mixer and the network comprises reducing the pressure in the mixer and network to approximately 0.1-0.3 bar.

6. The method of claim 1 wherein the flocculating reagent is mixed with the sludge in a collector located upstream of the mixer or injected into the mixer.

7. The method of claim 1 wherein the sludge, before treatment, includes a sludge dryness of less than 15 wt. % and wherein the method produces a dewatered sludge having a sludge dryness of 32 wt. % or greater.

8. The method of claim 1 wherein depressurising the mixer and the network causes the release of bound water from the sludge and furthermore depressurising the mixer and the network reduces the size of particles contained in the sludge.

9. The method of claim 1 wherein depressurising the mixer and the network has a duration of between 0.1 seconds and 30 seconds.

10. The method of claim 1 wherein depressurising the mixer and network gives rise to cavitation that in turn mechanically lysises the sludge.

11. The method of claim 1 wherein before destructuring the sludge, the method includes preheating the sludge by injecting hot water or steam into the sludge.

12. The method of claim 1 wherein prior to lysising the sludge, injecting dilution water into the sludge or oxygenating the sludge.

13. A system for dewatering sludge that employs a flocculating reagent to assist in dewatering the sludge, the system comprising:
   a mixer comprising a cylindrical chamber having rotating blades and configured to receive the sludge, destructure the sludge, reduce the viscosity of the sludge and to mix the sludge;
   a flocculating reagent line configured to inject a flocculating reagent into the sludge at or upstream of the mixer or downstream of the mixer;
   a dewatering unit disposed downstream of the mixer and configured to dewater the sludge;
   a transport network operatively interconnected between the mixer and the dewatering unit for directing sludge from the mixer to the dewatering unit; and
   means upstream of the dewatering unit for depressurising said mixer and network and lysising the sludge in the mixer and network by cavitation.

14. The system of claim 13 wherein the means for depressurising the mixer and network comprises a pump located in the network between the mixer and the dewatering unit and a valve located upstream of the mixer.

15. The system of claim 14 wherein there is provided a second valve in the network disposed between the pump and the dewatering unit.

16. The system of claim 13 wherein the dewatering unit is a centrifuge having a spout, and wherein the flocculation reagent line extends from a flocculation reagent source to the spout of the centrifuge and wherein the centrifuge and the flocculation reagent line are configured to mix the flocculation reagent with the sludge in the spout.

17. The system of claim 13 including a collector disposed upstream of the mixer; and wherein the flocculation reagent line extends from a flocculation reagent source to the collector and wherein the collector and flocculation reagent line are configured to mix the flocculation reagent with the sludge in the collector.

18. The system of claim 13 wherein the flocculation reagent line is operatively connected between a flocculation source and the mixer and wherein the flocculation reagent line and the mixer are configured to mix the flocculation reagent with the sludge in the mixer.

19. A method of dewatering sludge comprising:
   directing the sludge to a sludge collector;
   directing the sludge from the sludge collector through a first control valve and into a mixer having a cylindrical chamber provided with rotating blades;
   directing a flocculation reagent into the sludge collector or into the mixer;
   mixing the flocculation reagent with the sludge in the mixer;
   destructuring the sludge and reducing the viscosity of the sludge in the mixer by rotating the blades in the cylindrical chamber at a speed of 500-1,000 revolutions per minute;
   after destructuring the sludge, transferring the sludge from the mixer to a transport network operatively interconnected between the mixer and a dewatering unit and wherein the transport network includes a pump;
   with the assistance of the pump, pumping the sludge from the mixer through the network and to the dewatering unit;
   lysising the sludge in the mixer and in at least a portion of the network by depressurising the mixer and at least a portion of the network for at least 0.1 seconds which results in lysising the sludge by cavitation; and
   after lysising the sludge, dewatering the sludge in the dewatering unit.

20. The method of claim 19 wherein depressurising the mixer and at least a portion of the network includes partially closing said first valve and causing cavitation of the sludge in the mixer and in at least a portion of the network.

21. The method of claim 20 wherein there is a second control valve downstream of the pump and wherein the second control valve creates a loss of load downstream of the pump which, after the depressurising step, returns the pump to a non-cavitation state of operation.

* * * * *